(No Model.)

2 Sheets—Sheet 1.

F. CHALLONER.
SHINGLE SAWING MACHINE.

No. 581,266.　　　　　　　　　　Patented Apr. 27, 1897.

Witnesses:

Inventor:
Frank Challoner
By Winkler, Flanders, Smith, Bottum & Vilas
Attorneys.

THE NORRIS PETERS CO., PHOTO-LITHO., WASHINGTON, D. C.

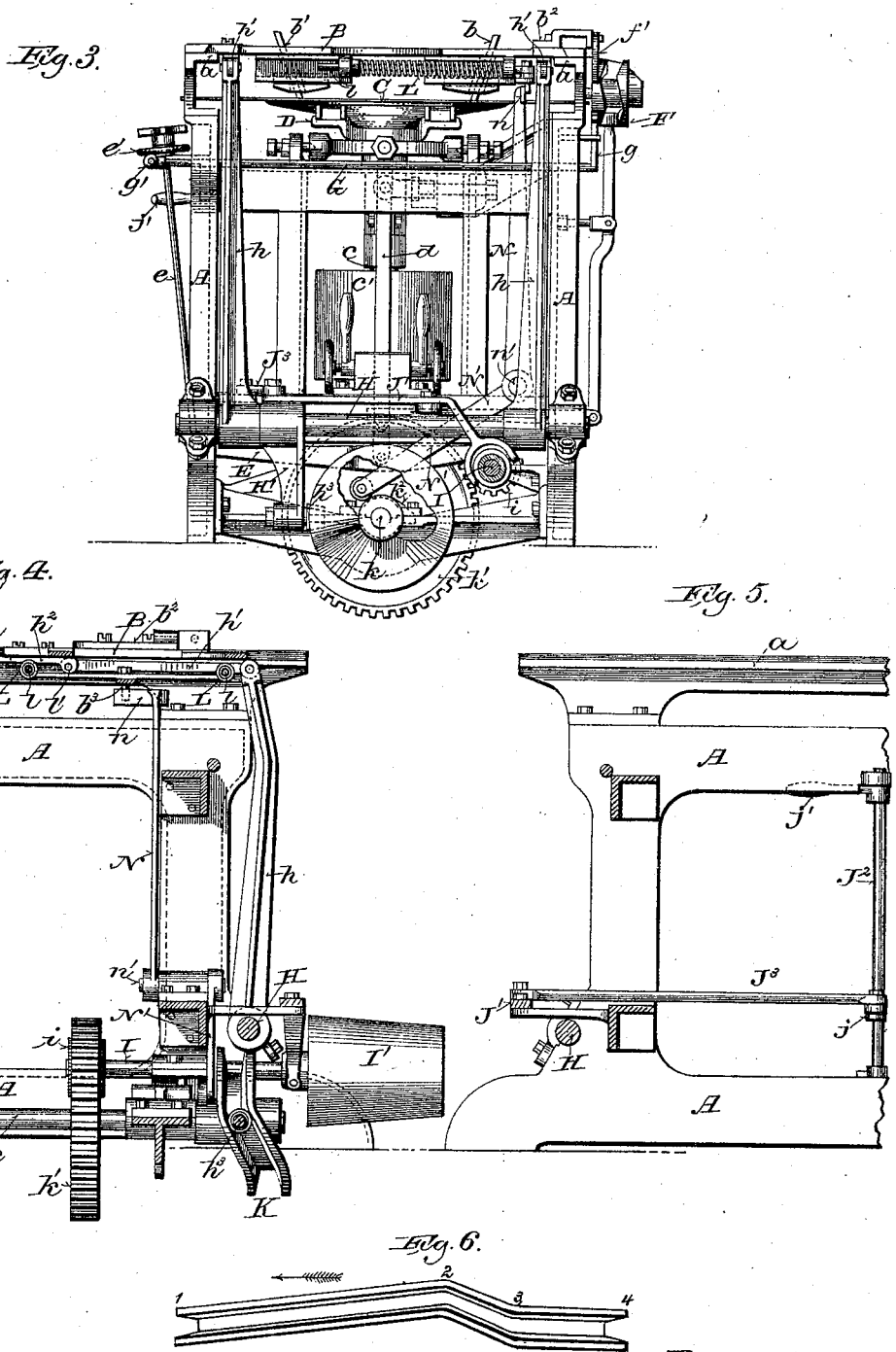

UNITED STATES PATENT OFFICE.

FRANK CHALLONER, OF OSHKOSH, WISCONSIN.

SHINGLE-SAWING MACHINE.

SPECIFICATION forming part of Letters Patent No. 581,266, dated April 27, 1897.

Application filed July 28, 1890. Serial No. 360,131. (No model.)

*To all whom it may concern:*

Be it known that I, FRANK CHALLONER, of Oshkosh, in the county of Winnebago and State of Wisconsin, have invented certain new and useful Improvements in Shingle-Sawing Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My improvements relate to shingle-sawing machines which employ one or more reciprocating "bolt-carriages." Its main objects are to operate the carriage or carriages by power, imparting thereto the desired movement, to automatically operate the dogs by which the bolts are held, and to vary the feed of the carriages independently of the speed of the saw.

It consists of certain peculiarities of construction and arrangement hereinafter described, and pointed out in the claims.

In the accompanying drawings like letters designate the same parts in the several figures.

Figure 1:
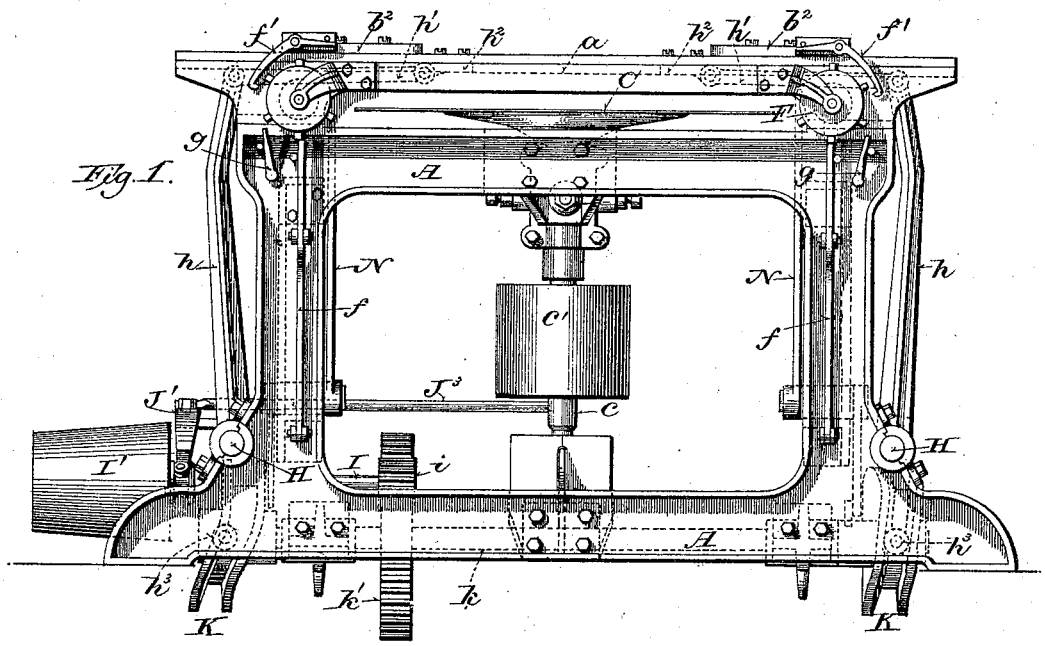
Figure 2:
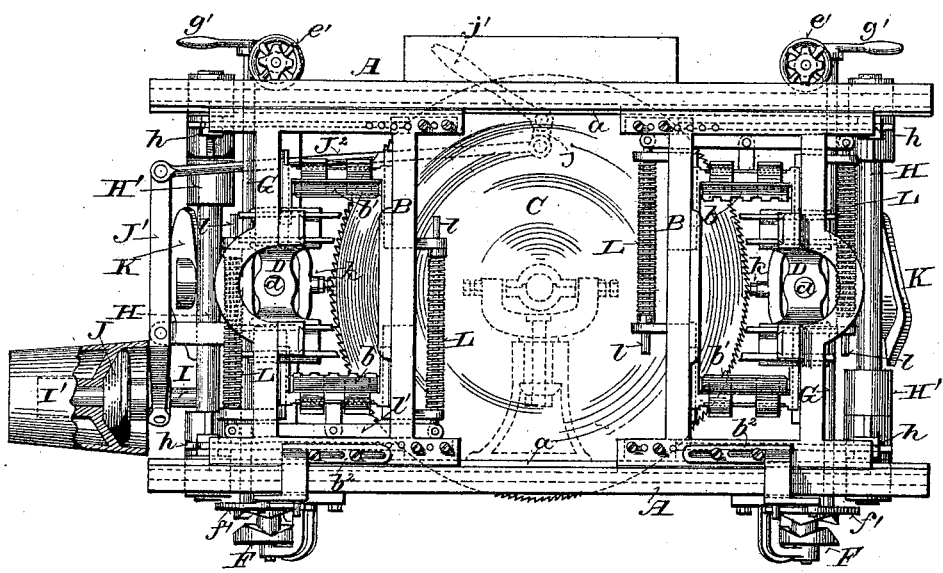

Figure 1 is a side elevation of a machine embodying my improvements. Fig. 2 is a plan view; Fig. 3, an end elevation. Fig. 4 is a partial vertical longitudinal section on a somewhat enlarged scale, showing the carriage-driving and the dog-operating mechanism. Fig. 5 is a similar section showing the clutch-operating connections, and Fig. 6 is a developed plan view of one of the carriage-actuating cams.

A represents the frame of the machine, of the usual or any suitable form, construction, and material. It is provided with ways $a\ a$, upon which are mounted the reciprocating shingle-bolt carriages B B. These carriages are each provided with the usual dogs $b$ and $b'$, the dog $b$ being movable and the dog $b'$ relatively fixed.

C represents the saw, supported in a horizontal position upon a central upright arbor $c$, which is provided with a driving-pulley $c'$ and has suitable bearings.

D D are tilt-tables located adjacent to the opposite edges of the saw, one at each end of the machine, and mounted upon the upper ends of the tilt-bars $d\ d$. The tilt-bars $d\ d$ rest at the lower ends in vibratory step-bearings pivoted to the cross-levers E, which are fulcrumed at one end to the frame A and are adjustably supported at the other end by upright screw-rods $e$ and adjusting-nuts $e'$.

F F are cams at one side of the machine near the top and one near each end, formed with zigzag cam-grooves and provided about their peripheries at suitable intervals with teeth. $f\ f$ are levers fulcrumed to the side of frame A, with their upper ends, which are provided with friction-rollers, inserted in the grooves of cams F and connected at their lower ends by rods, as indicated by dotted lines in Fig. 3, with the lower ends of the tilt-bars $d$.

To blocks $b^2\ b^2$, adjustably attached to the sides of the carriage toward the cams F F, are pivoted gravitating dogs $f'\ f'$, which are arranged to engage with the teeth on said cams and turn the latter an interval when the carriages advance and to ride over said teeth without moving the cams when the carriages return. The movement of the cams F an interval, as stated, operates, through the levers $f$ and their connections, to shift the tilt-tables D and reverse their inclination, so as to take the butts and points of the shingles alternately from opposite ends of the bolts.

G are rock-shafts extending across the machine, one at each end thereof, and provided at the ends adjacent to the cams F F with arms $g\ g$ and at the opposite ends with handles $g'\ g'$, by which said arms $g\ g$ are turned toward the center of the machine, so as to engage with teeth on said cams and turn them backward sufficiently to carry the teeth with which the dogs $f'$ would next engage out of range therewith. In this way the reversal of the tilt-tables is prevented whenever it is desired for "graining" the bolts, that is, taking two or more butts in succession from the same end of the bolts in order to bring the grain as nearly parallel as practicable with the plane of the saw.

The construction, arrangement, and operation of the parts hereinbefore described are substantially the same as those in machines of this class heretofore made, and I make no claim thereto *per se* in this application.

At each side of the machine, on horizontal rock-shafts H H, one at each end and near the base of the machine, are fixed upright vibratory arms $h$ $h$, which are connected at their upper ends with the sides of the carriages B by rods or links $h'$ $h'$. These connecting rods or links are pivoted to blocks $h^2$, which are adjustably attached to the carriages B, as shown in Fig. 4 and indicated by dotted lines in Figs. 1 and 2, so as to permit of the carriages being advanced as the saw is worn down to smaller diameter.

K K are cams mounted, one at each end of the machine, upon a horizontal shaft $k$, supported below and transversely to the shafts H. Each of these cams is formed in the periphery with a groove of approximately the shape when projected on a plane shown in Fig. 6, (although any other suitable form of cam may be used,) and in such groove is inserted a friction-roller $h^3$, journaled on the crank-pin of an arm H', which is fixed upon the adjacent rock-shaft H, as clearly shown in Fig. 3.

I is a counter-shaft parallel with shaft $k$ and provided with a cone-pulley I', loosely mounted thereon, and with a pinion $i$, which meshes with a gear $k'$ on shaft $k$, as shown in Figs. 3 and 4.

A bevel friction-wheel J, as shown in Fig. 2, is feathered on the shaft I and moved into and out of engagement with a corresponding coned web of the pulley I' by means of the forked lever J' (shown in Figs. 3 and 4) and its connections, consisting of the upright shaft $J^2$, having the crank-arm $j$ and handle $j'$, and of the rod $J^3$, connecting the lever J' with crank-arm $j$, as shown in Fig. 5. By these connections the operator is enabled to connect and disconnect the carriage-driving and dog-operating mechanism from the side of the machine where he ordinarily stands.

The cams K K are so set relatively to each other on the shaft $k$ that when one carriage is advanced over the saw the other carriage is returned over the tilt-table at the opposite end of the machine, and the cam-grooves are so constructed as to impart a slow, uniform, or gradually-accelerated advance movement to the carriages and a rapid return movement and to hold them at rest over the tilt-tables a sufficient interval for undogging and dropping the bolts on the tilt-tables and redogging them to cut the next shingles therefrom.

Referring to Fig. 6, representing the periphery of one of the cams K, while the roller $h^3$ of the crank-arm H' traverses that portion of the cam-groove from 1 to 2 the carriage will be gradually advanced at the desired speed, which will be determined by the inclination of the groove and the velocity of the cam. While said roller passes from 2 to 3 the carriage will be quickly returned to the starting-point, and in passing from 3 to 4 (the straight portion of the groove) the roller, through its intermediate connections with the carriage, will cause it to remain quiescent while the "bolt" is undogged, dropped upon the tilt-table, and redogged for sawing the next shingle.

The movable dogs $b$ $b$ are forced and held normally toward the relatively fixed dogs $b'$ $b'$ by springs L L, which act through the rods $l$ $l$ on cross-bars $l'$, connected with said dogs $b$ $b$, as shown in Figs. 2, 3, and 4. At or near each end of the machine and on the same side thereof with the movable dog I provide an upright arm N, having a cross-piece or horizontal extension $n$ at its upper end and fixed at its lower end on a rock-shaft $n'$, parallel with the shaft $k$. An arm N', fixed on and depending from said rock-shaft, is provided with a friction-roller $n^2$, which rides upon a cam $k^2$ on shaft $k$, as seen in Figs. 3 and 4. These arms N and N' constitute levers for which the rock-shafts $n'$ serve as fulcrums, and they are so arranged together with the cams $k^2$ $k^2$ that when the carriages rest over the tilt-tables D, while the straight portions of cams K are passing the friction-rollers $h^3$, the upper ends of the arms N will be moved outwardly by the action of the cams $k^2$ on the arms N', and the cross-pieces $n$, engaging with pins or projections $b^3$ on the under side of cross-bars $l'$, will force the dogs $b$ $b$ out of engagement with the shingle-bolts held in the carriages. The bolts thus released fall upon the tilt-tables, which give the proper inclination thereto for sawing the next shingles therefrom. As the extended portions of cams $k^2$ clear the friction-rollers on arms N' the upper ends of arms N swing inwardly, releasing said dogs $b$ $b$, which are again forced by springs L into engagement with the bolts. The cam-shaft $k$, through which the carriages are actuated and the dogs shifted, and the saw-arbor having separate driving connections, the speed of either may be regulated as desired without affecting the other.

The cams K K may be formed so as to produce the most advantageous movement of the carriages, a uniform feed of any desired rate, or a variable or accelerated advance.

Various changes in the details of the improvements constituting my invention may be made within the intended scope of my invention.

I claim—

1. In a shingle-sawing machine, the combination with a saw and tilt-table, of a reciprocating carriage arranged to travel back and forth over said saw and tilt-table, a rock-shaft arranged transversely to the travel of the carriage, and provided with vibratory arms linked to opposite sides of said carriage, and a driving-shaft arranged lengthwise of the machine parallel with the travel of the carriage, and provided with a cam which engages a projection on said rock-shaft and is constructed and arranged to produce a slow advance and a rapid return movement of the carriage, and a dwell at the end of its return movement over the tilt-table, substantially as and for the purposes set forth.

2. In a shingle-sawing machine, the combination with a saw and two tilt-tables arranged on opposite sides thereof, of two reciprocating carriages each arranged to travel back and forth over the saw and one of the tilt-tables, a shaft arranged lengthwise of the machine parallel with the travel of the carriage, and provided with two cams, and cross-shafts arranged at or near each end of the machine and provided with upwardly-projecting arms linked to the sides of the carriages, and with projections engaged by said cams which are constructed and arranged to advance said carriages alternately over the saw and to produce a slow advance and rapid return movement thereof and a dwell at the end of the return movement of each carriage over the corresponding tilt-table, substantially as and for the purposes set forth.

3. In a shingle-sawing machine, the combination of the saw, two reciprocating carriages provided with movable dogs, a shaft upon which are mounted two sets of cams, vibratory arms movable transversely to the travel of the carriages, and actuated by one set of cams, and vibratory arms actuated by the other set of cams and movable in the direction of the travel of the carriages with which they are connected, substantially as and for the purposes set forth.

4. In a shingle-sawing machine, the combination of the saw, a reciprocating carriage provided with a movable dog, a tilting device over which the carriage passes in its return movement, a rock-shaft transverse to the travel of the carriage provided with arms which are linked to said carriage, a vibratory arm movable transversely to the travel of the carriage and arranged to engage said dog when the carriage is over the tilting device, a shaft provided with cams, one arranged to actuate the dog-shifting arm and the other to actuate the arms connected with the carriage, substantially as and for the purposes set forth.

5. In a shingle-sawing machine, the combination of the saw and reciprocating carriages provided with movable dogs, dog-shifting arms or levers, vibratory carriage-actuating arms, a shaft provided with cams for operating said arms, and a counter-shaft geared with said cam-shaft and provided with a pulley and a clutch for connecting and disconnecting said pulley, substantially as and for the purposes set forth.

In testimony that I claim the foregoing as my own I affix my signature in presence of two witnesses.

FRANK CHALLONER.

Witnesses:
ELIAS H. BOTTUM,
CHAS L. GOSS.